(12) United States Patent
Van Den Bos et al.

(10) Patent No.: US 12,379,245 B2
(45) Date of Patent: Aug. 5, 2025

(54) SENSOR FOR MEASURING DIFFUSE SOLAR IRRADIANCE

(71) Applicant: HUKSEFLUX HOLDING B.V., Delft (NL)

(72) Inventors: Cornelis Jan Van Den Bos, Delft (NL); Eric Richard Hoeksema, The Hague (NL)

(73) Assignee: Hukseflux Holding B.V., Delft (NL)

( * ) Notice: Subject to any disclaimer, the term of this patent is extended or adjusted under 35 U.S.C. 154(b) by 0 days.

(21) Appl. No.: 18/559,228

(22) PCT Filed: May 23, 2022

(86) PCT No.: PCT/NL2022/050281
§ 371 (c)(1),
(2) Date: Nov. 6, 2023

(87) PCT Pub. No.: WO2022/250532
PCT Pub. Date: Dec. 1, 2022

(65) Prior Publication Data
US 2024/0240983 A1    Jul. 18, 2024

(30) Foreign Application Priority Data
May 25, 2021    (NL) .................................... 2028286

(51) Int. Cl.
*G01J 1/04*        (2006.01)
*G01J 1/42*        (2006.01)
(52) U.S. Cl.
CPC .......... *G01J 1/0437* (2013.01); *G01J 1/0411* (2013.01); *G01J 1/4228* (2013.01); *G01J 2001/4285* (2013.01)
(58) Field of Classification Search
CPC ...... G01J 1/0437; G01J 1/0411; G01J 1/4228; G01J 2001/4285; G01J 2001/4266

(Continued)

(56) References Cited

U.S. PATENT DOCUMENTS

| | | | | |
|---|---|---|---|---|
| 4,491,727 A | * | 1/1985 | Appelbaum | .......... G01J 1/4228 126/573 |
| 6,417,500 B1 | * | 7/2002 | Wood | ........................ G01J 1/04 250/237 R |

(Continued)

FOREIGN PATENT DOCUMENTS

| | | |
|---|---|---|
| EP | 1012633 A1 | 6/2000 |
| FR | 2707005 A1 | 12/1994 |

(Continued)

OTHER PUBLICATIONS

International Search Report for PCT/NL2022/050281 mailed Aug. 18, 2022, 3 pages.

(Continued)

*Primary Examiner* — Thanh Luu
*Assistant Examiner* — Mai Thi Ngoc Tran
(74) *Attorney, Agent, or Firm* — N.V. Nederlandsch Octrooibureau

(57) ABSTRACT

The invention shows a sensor for measuring diffuse solar irradiance including: an hemisphere having an approximately $2\pi$ steradian solid opening angle with a non-transparent layer and a transparent aperture pattern, the transparent aperture pattern providing a near-uniform transmission of the diffuse radiation as seen from near a center of the hemisphere, an aperture being an area occupying a part of the hemisphere surface area that is smaller than 2% and two or more light-sensitive sensors arranged in an array near the center of the hemisphere such that under any position of the sun relative to the sensor at least one of the two or more light-sensitive sensors is shaded from direct solar radiation by the hemisphere with aperture pattern.

19 Claims, 3 Drawing Sheets

(58) Field of Classification Search
USPC .................................................... 250/203.4
See application file for complete search history.

(56) References Cited

U.S. PATENT DOCUMENTS

2018/0205899 A1*  7/2018  Lieberman ........ H01L 27/14625
2021/0109186 A1*  4/2021  Alshaibani ................ G01J 1/42

FOREIGN PATENT DOCUMENTS

| GB | 2023812 A | 1/1980 |
| GB | 2266145 A | 10/1993 |
| WO | 9913359 A1 | 3/1999 |

OTHER PUBLICATIONS

Written Opinion of the ISA for PCT/NL2022/050281 mailed Aug. 18, 2022, 8 pages.

* cited by examiner

SENSOR FOR MEASURING DIFFUSE SOLAR IRRADIANCE

CROSS-REFERENCE TO RELATED APPLICATIONS

This application is the U.S. national phase of International Application No. PCT/NL2022/050281 filed May 23, 2022, which designated the U.S. and claims priority to NL 2028286 filed May 25, 2021, the entire contents of each of which are hereby incorporated by reference.

TECHNICAL FIELD

The invention relates to a sensor for the measurement of diffuse solar radiation, comprising a hemisphere having a shading pattern and a number of light-sensors. The invention also relates to a system comprising such a sensor and a pyranometer for accurate measurement of total solar irradiance and to separate direct and diffuse solar radiation.

BACKGROUND

A sensor for the measurement of solar radiation is known from EP1012633, for use for example in recording the duration and/or intensity of sunshine. The known sensor uses a combination of a hemispherical patterned dome of transparent material above a base plate and light-sensitive detectors carried by the base plate. The inner surface of the dome is patterned with opaque material such that the dome has areas which are opaque and other areas which are translucent. The pattern must ensure that at least one detector is always shaded from direct sunlight by an opaque area, and at least one detector can always receive direct sunlight through a translucent area. That way an indication of the intensity of both diffuse sunlight and direct sunlight may be recorded, by comparing the signals derived from the detectors exposed to the greatest and to the least amount of light.

However due to the simultaneous measurement of direct sunlight, the known sensor can only provide an estimate of diffuse sunlight, so that the accuracy of a total solar irradiance measurement is diminished. Furthermore, due to the requirement of both shaded and lighted sensor conditions, different sensor calibrations should be performed in order to improve measurement accuracy. Finally, production of the irregular shading pattern is relatively complex.

A growing application of solar radiation sensors is the assessment of electrical output of photovoltaic (PV) systems. Based on the solar radiation measured by the sensor, a theoretically achievable electrical output of the PV system can be calculated for a given light sensitive surface area and PV conversion efficiency, and compared to an actual electrical output. The comparison allows to evaluate a performance of the PV system, i.e. allowing to quantify system losses. PV devices may convert, besides concentrated solar light, also low-level diffuse light into electricity.

In order to accurately assess the performance of the newest PV systems also including bifacial PV systems it is thus best that both direct and diffuse solar components are separated.

A pyranometer measures solar irradiance in W/m$^2$ from solar radiation ($\approx$285 to 3000 nm) received by a plane surface from a 180° field of view angle, or 2pi steradian solid angle. The solar radiation corresponds to the total solar radiation, including both direct and diffuse light.

It is therefore an object of the invention to provide a solar radiation sensor equipped with a well-defined and easily reproducible shading pattern for accurately measuring a diffuse solar irradiance. It is a further objection of the invention to provide a measurement system comprising a sensor from which both diffuse and direct irradiance can be accurately separated. It is another object of the invention to provide a reliable solar radiation sensor and measurement system for an accurate assessment of the performance of photovoltaic systems.

SUMMARY OF THE INVENTION

To this end, the present invention provides a sensor for measuring diffuse solar irradiance comprising: an hemisphere having an approximately 2$\pi$ steradian solid opening angle with a non-transparent layer and a transparent aperture pattern, the transparent aperture pattern providing a near-uniform transmission of the diffuse radiation as seen from near a center of the hemisphere, an aperture being an area occupying a part of the hemisphere surface area that is smaller than 2% and two or more light-sensitive sensors arranged in an array near the center of the hemisphere such that under any position of the sun relative to the sensor at least one of the two or more light-sensitive sensors is shaded from direct solar radiation by the hemisphere with aperture pattern.

The hemisphere and aperture pattern provide a large field of view for the light-sensitive sensors of the entire sky hemisphere above the sensors. The transparency of the apertures, shaped as a pattern, allows sunlight to penetrate the hemisphere at regular spatial intervals. Or, thanks to the non-transparent layer, light transmission is blocked at regular spatial intervals. The hemisphere covering the sensors provides shielding to the sensors from the environment. Also, by only requiring a small surface area of the hemisphere as a transparent pattern, the sensor can be easily manufactured because most of the surface is made of a non-transparent layer.

Furthermore, the near-uniform transmission of diffuse radiation provides a reliable reproduction of the diffuse sky in all directions of the solid angle above the plane of the light-sensitive sensors. The main result is a higher measurement accuracy for the diffused irradiance.

The placement of the array of the two or more light-sensitive sensors near a center of the hemisphere allows a substantially similar, preferably identical position of any sensor relative to the pattern and hemisphere, resulting in an identical directional response for all sensors, making it possible to easily calibrate the sensors. By contrast, sensors built according to EP1012633 can only be calibrated by the manufacturer.

Having at all time at least one sensor shaded allows continuous measurement of the diffuse solar irradiance at all sun positions, independently of direct solar irradiance.

In an embodiment, the non-transparent layer comprises a printed or otherwise deposited shading pattern on a transparent material. The patterned hemisphere of the sensor is easily manufactured from a transparent material shaped as a hemisphere, for instance a glass dome. Other transparent domes such as plastic domes may be considered provided that light transmission is between 90 and 100%. The patterned layer can be formed, for instance, in two steps, by laser ablation of a pre-vapor deposited coating or printed coating onto the glass dome. The coating may be a black paint layer or metal layer for example of aluminum with a transmission of smaller than 1%. Alternatively the coating and aperture pattern can be both constructed in one step by 3D mask printing onto the glass dome. Other alternative techniques (e.g. chemical deposition) known to form a non-transparent coating and an aperture pattern onto a transparent dome may as well be considered.

In an embodiment, the array of light-sensitive sensors comprises an integrated circuit containing a sensor array. By using a combination of a sensor array and an integrated circuit, the response of all of the one of more light sensitive sensors can be reliably and efficiently monitored at all times during calibration and measurement.

In an embodiment, the aperture pattern is arranged according to a Fibonacci lattice. The aperture pattern is provided with a high symmetry or very even distribution that facilitates manufacture as each aperture is defined by its exact coordinates on the dome. The pattern may be applied to any arbitrary aperture shape, e.g circular, rectangular. Further the high symmetry allows an accurate reproduction of the diffuse sky by providing a light transmission through the hemisphere surface at regular intervals.

In an embodiment, a view factor or average transmission of the hemisphere with the aperture pattern is larger than 10%. The pattern provides sufficient light transmission for accurate measurement of irradiance by the light sensitive sensors.

In an embodiment, at least one of the two or more light-sensitive sensors is equipped with front optics, such as a lens, view limiting aperture or diffusor. With additional optics, the field of view of any of the two or more light-sensitive sensors to the $2\pi$ steradian solid opening angle can be adjusted and any difference in lateral, vertical or angular position of two or more of the sensors to the other sensors can be corrected for. As a result, the two or more light-sensitive sensors have a substantially identical, preferably identical directional response to sunlight impinging their surface.

In an embodiment, the sensor comprises a further $2\pi$ steradian solid opening angle hemisphere of transparent material, at a vertical distance from the hemisphere. The hemisphere of transparent material, for instance a glass or transparent plastic dome, provides, without restricting the view angle of the light-sensitive sensors, an environmental and radiation shield for the sensors. On one hand, sensitivity to the environment (wind, rain, snow . . . ) is reduced, while on another hand, only solar radiation is allowed to heat up the sensor surface and not far-infrared radiation. The additional dome therefore results in a better thermal equilibrium between the light sensitive sensors and the hemisphere and provides a strong reduction of instrumental offsets. The additional dome further provides room for ventilation and cooling down of the hemisphere with aperture pattern.

In an embodiment, the light-sensitive sensors have a same position relative to the hemisphere, located on a substantially flat plane and within a radius from the hemisphere center of smaller than 0.5 times an hemisphere inner radius, so that the sensors have a substantially identical directional response, and thus a substantially identical sensitivity to the diffuse irradiance. The positioning of the sensors at a close vicinity of the hemisphere center allows any of the sensors that are shaded from direct solar radiation to provide a reliable measurement of the diffuse solar irradiance as all sensors have a substantially identical response and sensitivity to sunlight.

In an embodiment the hemisphere has a spatial distribution that combines with the spatial distribution of the sensor array, such that most of the time, preferably always, at least one sensor is completely shaded from direct sunlight, a view factor being of a substantially large value, so that the diffuse signal is above a predetermined threshold. The complete shading of at least one sensor from direct sunlight allows that only diffuse sunlight impinges this sensor, rendering the measurement of diffuse irradiance at all time for all positions of the sun relative to the sensor more accurate and less sensitive to instrumental offsets.

In an embodiment, a system comprises the said sensor, and a pyranometer, for measurement of separate direct and diffuse solar radiation. The system allows accurate measurement of separate direct and diffuse solar radiation, where the direct solar radiation can be calculated from subtracting the diffuse solar radiation measured by the sensor, to the total radiation (sum of diffuse and direct light) measured by the pyranometer.

In an embodiment the system further comprises a control unit adapted to give direct and diffuse solar radiation values as separate outputs and calculate a theoretically achievable electrical output of a PV power plant, compare this achievable output to an actual output to assess the PV power plant performance. Separate and accurate values of direct and diffuse solar irradiance can be calculated by the control unit, storing and processing the difference of values of diffuse solar radiation measured by the sensor and the total radiation (sum of diffuse and direct light) measured by the pyranometer.

In an embodiment the system is combined with a GPS system or other infrastructure providing information on local solar position and geographical position, and adapted to calculate a direct normal solar irradiance. An accurate value of the irradiance of the direct solar beam received on a plane normal to the beam direction can be extracted from the direct solar irradiance measured by the system, based on combined GPS data, allowing assessment of performance of PV systems under direct illumination.

DETAILED DESCRIPTION OF EMBODIMENTS

Figure 1:
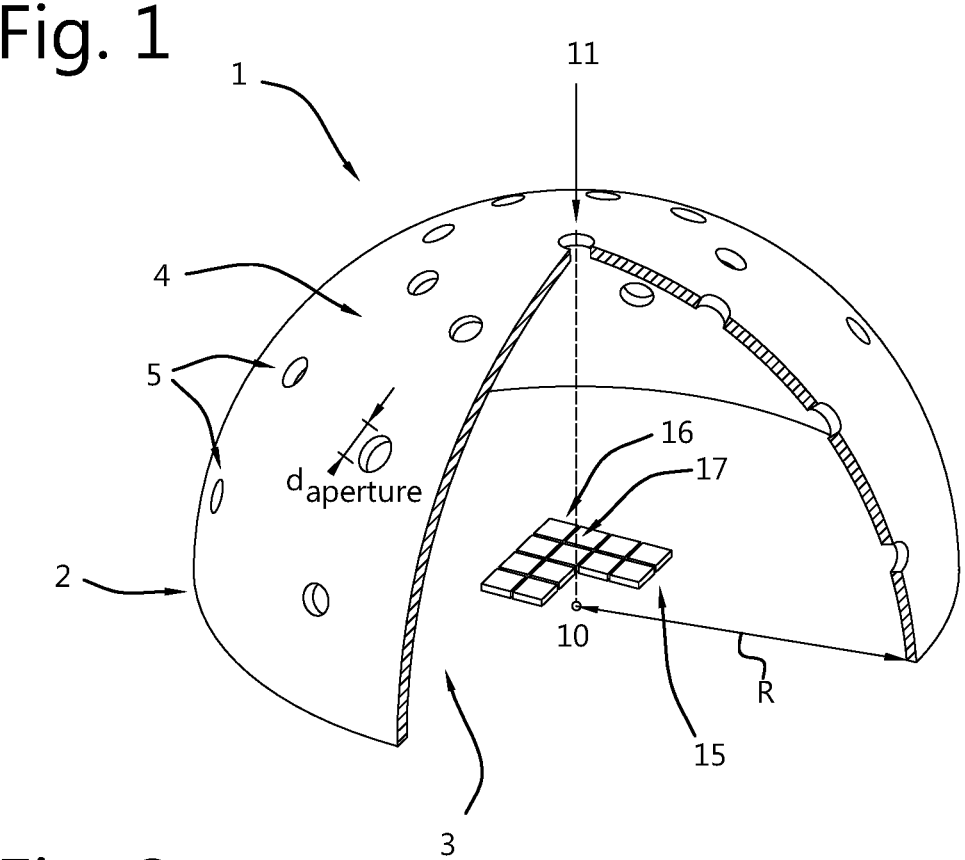
FIG. 1 shows a perspective view of a sensor for measuring diffuse solar irradiance according to the invention with a cut-out to the inside of the sensor.

FIG. 1 shows a perspective side view of sensor 1 for measuring diffuse solar irradiance according to the invention, with a cut-out showing an inside 3 of the sensor. The sensor 1 comprises an hemisphere 2 of radius R from 10 to 150 mm and a number of light-sensitive sensors 16; 17; . . . near a center 10 of the hemisphere. The hemisphere 2 comprises on its outer surface exposed to sun radiation, a non-transparent layer 4 having a transmission of smaller than 1%, for example vapor deposited—or chemically deposited metals of 0.01 to 100 microns thickness or plastic or painted coatings on a transparent dome at its inner or outer surface and a number of light transparent apertures with a transparency of larger than 80% arranged in a pattern 5 allowing light to enter the inside of the dome. The transparency of the dome and apertures is provided by using glass material, or alternatively plastics in the thickness range of 0.05 to 5 mm. The non-transparent layer and the apertures are in use exposed to solar radiation. The apertures shown are of a circular shape but may be of another arbitrary shape such as squares or rectangles with all apertures having the same size $d_{aperture}$, the size determined by the size of light-sensitive sensors 16, 17. The area of an aperture does not exceed 2% of the total surface area of the hemisphere. The apertures are evenly dispersed in a pattern 5 on the hemisphere surface and may be symmetrical around a top point 11 of the hemisphere. The aperture 11 approximately at a top point allows measurement of diffuse irradiance when the sun is at zenith. The light-sensitive sensors 16, 17 . . . placed at the vicinity of the center 10 of the hemisphere, are arranged in an array 15 of sensors, the center of the array being substantially at the center 10. Preferably all the sensors are placed in a circle of 0.5× radius R of the hemisphere. They may be arranged in an integrated circuit and equipped with additional optics (not shown). Each of the two or more light-sensitive sensors comprise a sensor body or thermopile with a black coating absorbing in the 0.3 to 3 micrometer range to absorb solar radiation, convert it to heat, and generate an output voltage signal proportional to the solar irradiance. The sensor body may also be a photo-diode, for example a silicon photodiode sensitive in the 0.3 to 0.7 micrometer range, converting solar photons into a current. The pattern provides, as seen from the centre 10 of the hemisphere, a near-uniform transmission of the diffuse radiation, independent of zenith or azimuth angle of the diffuse sky. Details on the aperture pattern will be provided along with the description of FIG. 3.

Figure 2:
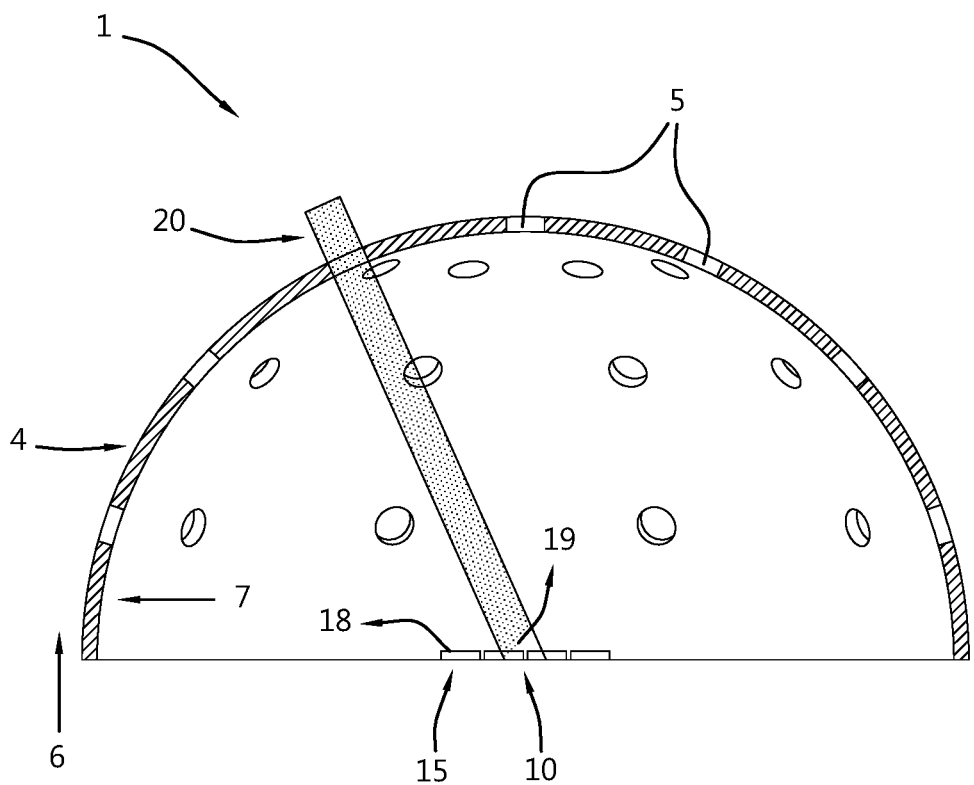
FIG. 2 shows a lateral cross-section of a sensor for measuring diffuse solar irradiance according to the invention.

FIG. 2 shows a lateral cross-section of sensor 1 of FIG. 1 for measuring diffuse solar irradiance according to the invention along the center point of the hemisphere 10. The sensor is shown in use exposed to direct light radiation 20 impinging on two or more the light sensitive sensors, thus lighted sensors 19, and leaving at least one sensor 18 not exposed at all to direct radiation, or shaded, by the pattern 5. In other embodiments it may be no sensor is lighted, and all sensors are shaded. The transparent dome 6 of the hemisphere 2 has a substantially uniform thickness between 0.05 and 5 millimeters onto which the non-transparent coating 4 is deposited on the outer wall of the dome 6 where sunlight impinges. The wall 7 at the inside of the hemisphere may in an alternative embodiment be used to deposit the non-transparent layer 4 and the outer wall of the dome left transparent. Either the pattern 5 is formed by removing the coating 4 after its deposition at regular intervals so as to form the pattern, or coating 4 is directly deposited with a mask shaped as the desired pattern in order to leave openings 5 transparent. Such techniques may involve vapor deposition and laser ablation at one hand, or mask 3D printing at another hand. Other alternative techniques and available to coat a glass hemisphere, and constructing a uniform pattern may be considered.

Figure 3:
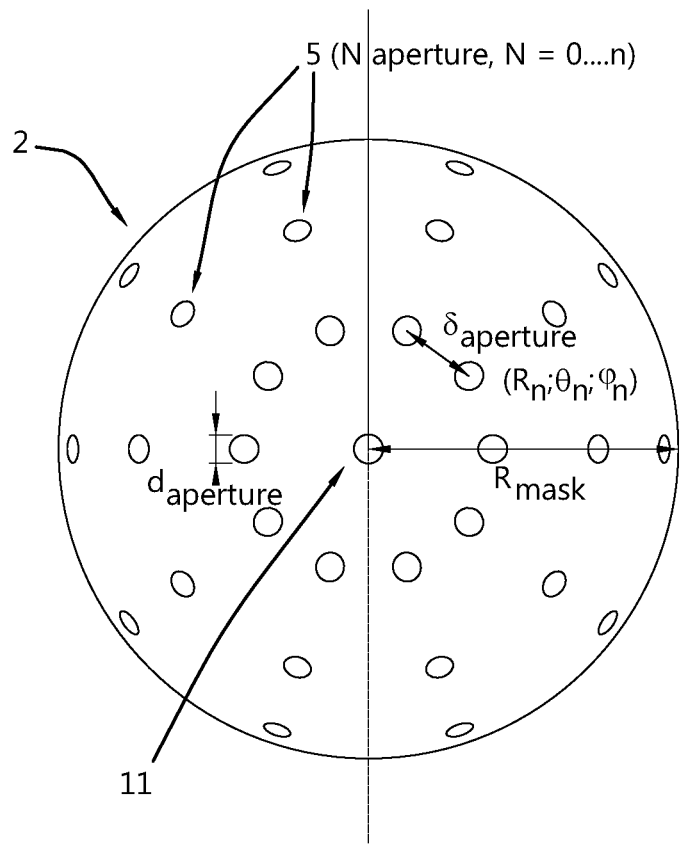
FIG. 3 shows a top view of a sensor for measuring diffuse solar irradiance according to the invention.

FIG. 3 shows a top view of an exemplary sensor 1 of FIG. 1 for measuring diffuse solar irradiance according to the invention, and comprising a pattern 5 with a number N of apertures (n=0 . . . N, with n the aperture number). A center point of the pattern 5 of apertures is chosen as the top point of the hemisphere 11. Measurement at zenith position of the sun is permitted by the top point being an aperture itself. This pattern is obtained by placing each center of an aperture n out of the N apertures on a Fibonacci lattice; with the apertures placed at the following spherical coordinates ($R_n$; $\theta_n$; $\phi_n$) and creating an approximately uniform transmission aperture pattern:

$$(Rn; \theta n; \varphi n) = \left(R_{mask}; \frac{\pi}{2} - \arcsin\left(\frac{2n}{2N+1}\right); 2\pi n \Phi^{-1}\right)$$

With, $R_n$: the radial distance from the centre of the pattern, corresponding to top point 11 of the hemisphere, to aperture number n $\theta_n$: the polar coordinate (also known as zenith angle or colatitude) of aperture number n $\phi_n$: the azimuthal coordinate (also known as longitude) of aperture number n $R_{mask}$: the radius of the imaginary hemisphere on which the pattern is deposited, i.e. the inner or outer radius of a transparent dome, or the radius of a non-transparent mask in which the apertures are cut-out, $\phi$: the Golden ratio, approximately 1.618 . . . and $\pi$: the ratio of a circle's circumference to its diameter, approximately 3.14159 . . . .

All apertures have one arbitrary shape, of which the number N and the size $d_{aperture}$ is controlled so as for its surface area not to exceed 2% of the surface area of the hemisphere $3\pi R_{mask}^2$ and also for the (angular) edge-to-edge distance $\delta$ between apertures to obey:

$$\delta \geq 2\arcsin\left[\frac{2\sqrt{2d_{pix}}}{2R_{mask}}\cos^2\left(\frac{\alpha_{sun}}{2}\right) + \sqrt{\left(\frac{2\sqrt{2}d_{pix}}{2R_{mask}}\right)^2\left[\cos^4\left(\frac{\alpha_{sun}}{2}\right) - \cos^2\left(\frac{\alpha_{sun}}{2}\right)\right] + \sin^2\left(\frac{\alpha_{sun}}{2}\right)}\right]$$

With:

$d_{pix}$: the sensor pixel pitch, $R_{mask}$: the radius of the (imaginary) hemisphere with the aperture pattern, and $\alpha_{sun}$: the opening angle of the sun. Details of the sensor such as $d_{pix}$ are shown in FIG. 4.

That optimization allows that most of the time, preferably always, at least one pixel of alight-sensitive sensor is completely shaded from direct sunlight, while still having a sufficiently large view factor, so that the diffuse signal is sufficiently large to be measurable. Preferably more than one pixel is shaded from the direct sun.

Figure 4:
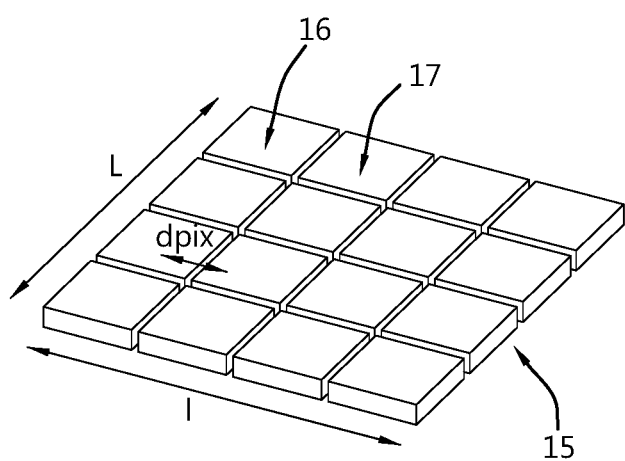
FIG. 4 shows a perspective view of a light sensitive sensor array according to the invention.

FIG. 4 shows a perspective view of an exemplary square sensor array 15 according to the invention comprising a 4×4 set of light sensitive sensors 16, 17 of a surface area L×I. Each sensor comprises a sensor body sensitive to solar light. Each of the light sensitive sensors has substantially the same area exposed to light from the sky, comprising a number of light-sensitive pixels of which the pixel pitch $d_{pix}$ impose a minimum angular distance between the pattern apertures of the hemisphere, as seen in FIG. 3. Preferably the sensor array is located within 0.5×R of the hemisphere center 10, i.e L×I≤π(R/2)². Sensors may be calibrated by exposure to a diffuse source, either with or without the hemisphere with shading pattern respectively for sensitivity to direct and diffuse solar radiation.

As an example an aperture pattern with N=1300 circular apertures on a hemisphere, a hemisphere radius R of 18 mm and aperture size of 0.750 mm (diameter) can be used in combination with a square sensor array consisting of 32 pixels×32 pixels, with a 0.09 mm×0.09 mm pitch (sensitive area per pixel: 0.04 mm×0.04 mm). The view-factor (average transmission as a fraction of the unobstructed 100% view-factor for a half-dome) in this case is approximately 28.2%. In this example the surface area of a single aperture is around 0.02% of the surface area of the half-sphere.

Figure 5:
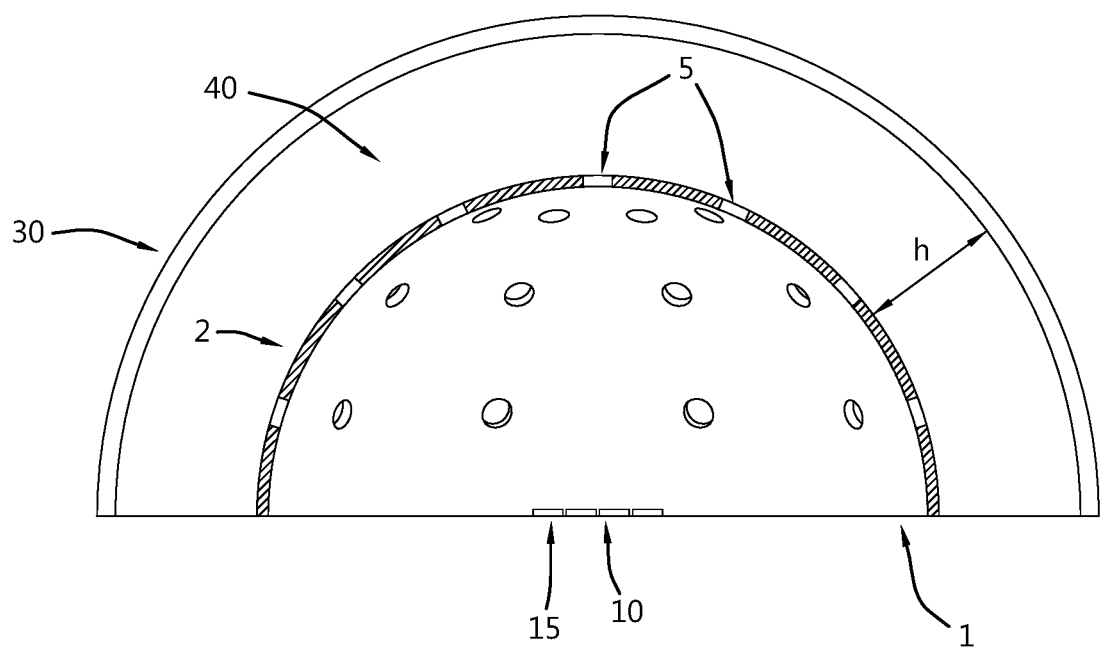
FIG. 5 shows a lateral cross-section of a sensor for measuring diffuse solar irradiance according to the invention.

FIG. 5 shows a cross-sectional view of the sensor 1 for measuring diffuse solar irradiance according to an embodiment of the invention, the sensor comprising the elements of sensor 1 of FIG. 1, further comprising an additional glass/transparent plastic hemisphere 30 separated by a vertical distance h to the first hemisphere with h between 1 and 20 millimeters, forming available empty volume 40 between both hemispheres. The sensor with an additional hemisphere provides corrections for thermal radiation offsets due to far infrared radiation impinging the hemisphere outer surface, improving further accuracy of the measured diffuse irradiance. Ventilation may be provided in the volume 40 to correct for further offsets. In alternative embodiments the sensor may comprise more than one additional hemisphere.

Figure 6:
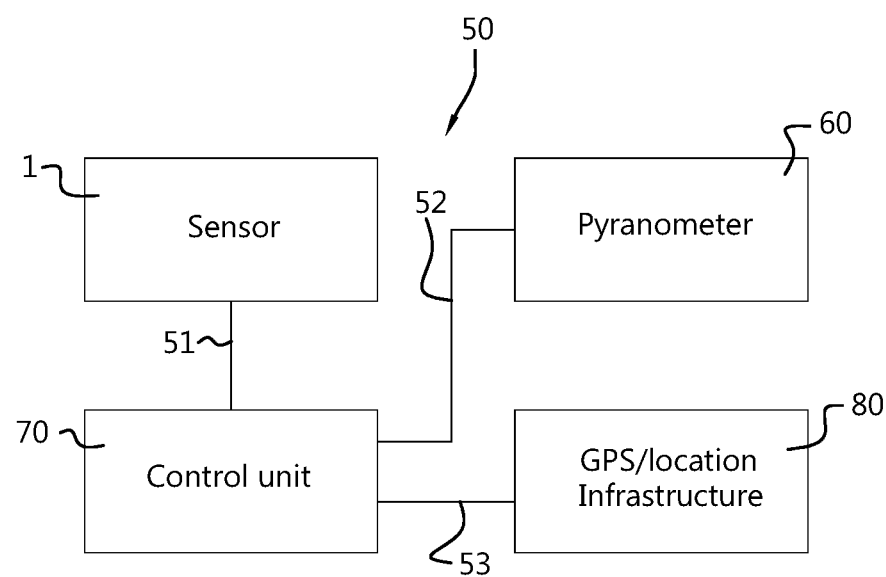
FIG. 6 shows a schematics view of a system for accurate measurement of both direct and diffuse solar irradiance according to the invention.

FIG. 6 shows a schematics of a system 50 comprising the sensor 1 for measuring diffuse solar irradiance of the invention, a pyranometer 60 for measurement of a sum of direct and diffuse solar irradiance further described as total solar irradiance, a control unit 70, and optionally a GPS or other location infrastructure 80. The sensor, pyranometer and geolocation unit are each electrically connected to the control unit 51, 52, 53. The pyranometer and the sensor have a substantially similar, preferably identical field of view. The pyranometer may be a standard pyranometer. The control unit 70 records a value of diffuse solar irradiance and a value of the total solar irradiance measured by each of the sensors at a solar position. The control unit further calculates the direct solar irradiance by subtracting the diffuse solar irradiance from the total solar irradiance at one solar position. The control unit may further calculate the theoretically achievable electrical output of a photovoltaic system under same illumination conditions of direct and diffuse light, and compare it to the real output of the photovoltaic system, from which a PV system performance can be derived. The GPS or other location infrastructure may provide to the control unit local solar position and geographical position, from which the direct normal irradiance may be output as a function of these parameters.

The invention claimed is:

1. A sensor for measuring diffuse solar irradiance comprising:
a hemisphere having an approximately 2π steradian solid opening angle with an inner wall having a hemisphere inner radius and an outer wall, the hemisphere having a non-transparent layer and a transparent aperture pattern, the transparent aperture pattern providing a near-uniform transmission of the diffuse radiation as seen from near a center of the hemisphere, an aperture being an area occupying a part of the hemisphere surface area that is smaller than 2%, and
two or more light-sensitive sensors arranged in an array near the center of the hemisphere such that at any position of the sun relative to the sensor at least one of the two or more light-sensitive sensors is shaded from direct solar radiation by the hemisphere with aperture pattern and
wherein all the light-sensitive sensors are located on a substantially flat plane within a radius from the hemisphere center of smaller than 0.5 times the hemisphere inner radius, so that the sensors have a substantially same position relative to the hemisphere and thus substantially identical directional response, and thus a substantially identical sensitivity to the diffuse irradiance.

2. The sensor according to claim 1, wherein the non-transparent layer comprises a printed or otherwise deposited shading pattern on a transparent material.

3. The sensor according to claim 1, wherein the array of light-sensitive sensors comprises an integrated circuit containing a sensor array.

4. The sensor according to claim 1, wherein the aperture pattern is arranged according to a Fibonacci lattice.

5. The sensor according to claim 1, wherein a view factor or average transmission of the hemisphere with the aperture pattern is larger than 10%.

6. The sensor according to claim 1, wherein at least one of the two or more light-sensitive sensors is equipped with front optics.

7. The sensor according to claim 1, comprising a further 2π steradian solid opening angle hemisphere of transparent material, at a vertical distance from the hemisphere.

8. The sensor according to claim 1, the hemisphere having a spatial distribution that combines with the spatial distribution of the sensor array, such that most of the time, at least one sensor is completely shaded from direct sunlight, a view factor being of a substantially large value, so that the diffuse signal is above a predetermined threshold.

9. A system comprising the sensor according to claim 1, and a pyranometer, for measurement of separate direct and diffuse solar radiation.

10. The system according to claim 9, further comprising a control unit adapted to give direct and diffuse solar radiation values as separate outputs and calculate a theoretically achievable electrical output of a PV power plant, compare this achievable output to an actual output to assess the PV power plant performance.

11. The system according to claim 9, combined with a GPS system or other infrastructure providing information on local solar position and geographical position, and adapted to calculate a direct normal solar irradiance.

12. The sensor according to claim 3, wherein at least one of the two or more light-sensitive sensors is equipped with front optics.

13. A sensor for measuring diffuse solar irradiance comprising two or more light-sensitive sensors and a hemisphere with an inner radius R from 10 to 150 mm, a thickness in the range of 0.05 to 5 mm and a base, wherein:
the outer surface of the hemisphere comprises a non-transparent layer and a transparent aperture pattern, wherein each aperture has (i) an area less than 2% of the curved hemisphere surface area, and (ii) the apertures are evenly dispersed in a pattern on the hemisphere surface symmetrical around a top point of the hemisphere;
the light sensitive sensors are arranged in an array on the base within a distance of 0.5 times the hemisphere inner radius from the center of the base.

14. The sensor according to claim 13, wherein the non-transparent layer comprises vapor deposited or chemically deposited metals of 0.01 to 100 microns thickness.

15. The sensor according to claim 13, wherein the non-transparent layer comprises plastic or painted coatings on the inner surface of the hemisphere.

16. The sensor according to claim 13, wherein the light-sensitive sensors comprise a sensor body or a thermopile with a black coating absorbing in the wavelength range of 0.3 to 3 micrometer.

17. The sensor according to claim 13, wherein the light-sensitive sensors comprise a sensor body or photodiode, sensitive in the wavelength range of 0.3 to 0.7 micrometer.

18. The sensor according to claim 13, wherein the aperture pattern is arranged according to a Fibonacci lattice.

19. The sensor according to claim 13, wherein at least one of the two or more light-sensitive sensors is equipped with front optics.

* * * * *